Dec. 28, 1965   G. F. TOPINKA   3,225,612

VALVE OPERATOR

Filed June 17, 1963

INVENTOR.
GEORGE F. TOPINKA
BY
John N. Wolfram
ATTORNEY

United States Patent Office 3,225,612
Patented Dec. 28, 1965

3,225,612
VALVE OPERATOR
George F. Topinka, Riverside, Ill., assignor to Parker-Hannifin Corporation, Cleveland, Ohio, a corporation of Ohio
Filed June 17, 1963, Ser. No. 288,364
7 Claims. (Cl. 74—102)

This invention relates to an operating mechanism for turning a rotary valve member, and more particularly to a valve operator utilizing a linearly acting fluid pressure motor for supplying the power to angularly reciprocate a valve member through an angle of approximately 90 degrees.

When a linearly acting fluid pressure motor is used for turning a rotary valve member, there are various methods for coverting the linear motion to rotary motion. One such method is to mount a link upon the valve shaft and to connect the outer end of the link to the piston rod of the motor and with the path of the piston rod movement being radially offset from valve shaft. In this method either the motor must be pivotally mounted so that the path of the piston rod movement can vary to compensate for the arc in which the connection between the piston rod and link swings, or there must be a loose connection between the piston rod and link to permit the distance from such connection to the center of the shaft to vary as the link moves angularly. The present invention is an improvement in the former method and has for an object the provision of such an operating mechanism which is of minimum bulk and weight and which is simple to manufacture and of minimum cost.

Another object is to provide a valve operating mechanism of the type described in which a mounting pin about which the motor pivots is rigidly attached to the motor and one end thereof and has an opening through which the piston rod passes.

It is another object to provide a valve operating mechanism of the type described in which the pivot pin for the motor also serves as an outboard bearing for the piston rod.

It is another object to provide a valve operator of the type described in which a given operator may be used with fluid pressure motors of various bore diameters.

Figure 1:
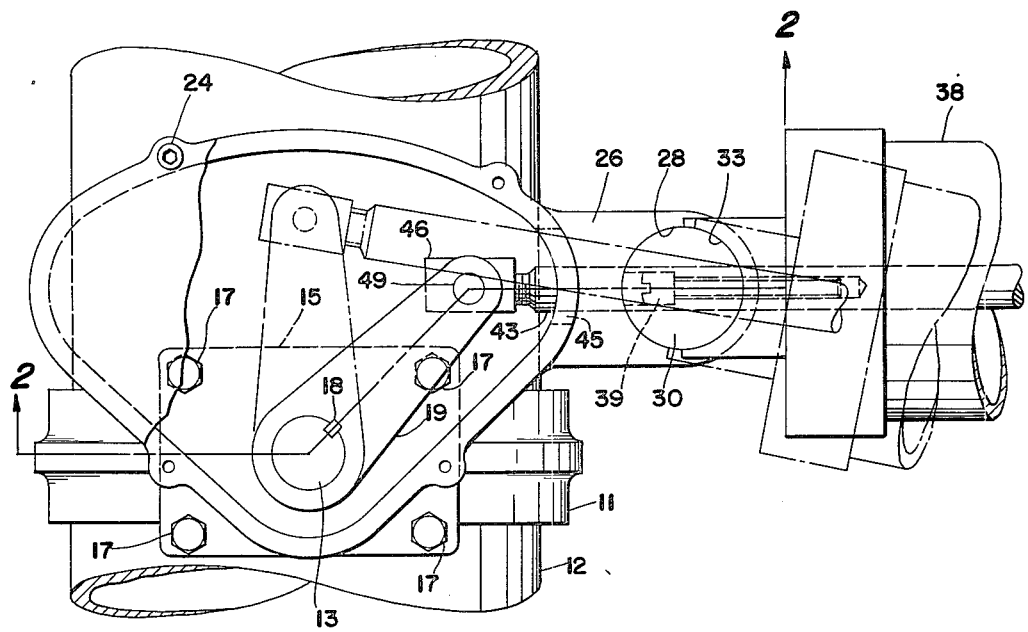
Figure 2:
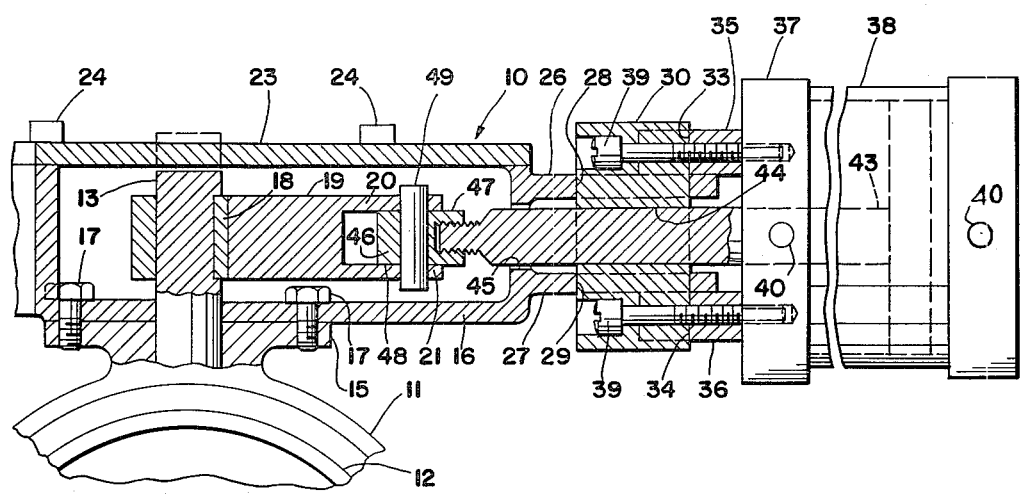

Other objects of the invention will be apparent from the following description and from the drawings in which, FIG. 1 is a top view of the mechanism, and
FIG. 2 is a cross section view of the mechanism through lines 2—2 of FIG. 1.

In the form of the invention illustrated, operating mechanism 10 is adapted to operate a rotary butterfly type valve 11 mounted in a pipe line 12 and having an operating shaft 13 which when angularly reciprocated in an arc of approximately 90 degrees opens and closes valve 11. The valve has a mounting flange 15 to which an operator mechanism housing 16 is rigidly attached by bolts 17. Keyed to shaft 13 by a key 18 is a link 19 which is bifurcated at its outer end to provide spaced legs 20, 21. A cover plate 23 closes the housing and is attached thereto by bolts 24. As shown in FIGURE 2, valve shaft 13 terminates short of cover 23. If desired, it can be extended through the cover as shown by the dotted lines, so as to have bearing support from the cover.

Housing 16 has a pair of spaced projecting brackets 26, 27 having circular openings 28, 29 therein for rotatably receiving a pivot pin 30.

Pin 30 is retained in semi-circular openings 33, 34 in a pair of brackets 35, 36 by a pair of bolts 39 threaded into end cap 37 and which also serve to clamp the brackets against the end cap. Alternatively, brackets 35, 36 may be welded or otherwise attached to the end cap, in which case bolts 39 are still used for rigidly attaching pin 30 to the brackets. Fluid pressure motor 38 has a piston therein, not shown, which is movable by fluid pressure alternately introduced and expelled from opposite ends of the motor through ports 40. Attached to the piston is a piston rod 43 which projects from the one end cap 37 through a circular opening 44 in pin 30 and through opening 45 into housing 16. The end of piston rod 43 is threadably connected to a nut 46 having flat sides 47, 48 fitted between legs 20, 21 of link 19 and pivotally attached thereto by pin 49. Piston rod 43 preferably has a slight clearance with pin opening 44 but if desired it may have a close sliding fit therein so as to receive bearing support therefrom.

When it is desired to turn valve shaft 13 counterclockwise from the position shown by the full line of FIGURE 1, fluid under pressure is admitted to the right hand end of motor 38 to cause piston rod 43 to move to an extended position relative to motor 38. The direction of travel of piston rod 43 is at all times offset from the center of valve shaft 13. As piston rod 43 moves, it causes link 19, and hence valve shaft 13, to move angularly. Because of this angular motion and the fixed distance between shaft 13 and the connection of piston rod 43 with link 19, the direction of travel of the piston rod constantly changes as the piston rod extends and retracts relative to motor 38. To accommodate this change of direction motor 38 and piston rod 43 pivot about the axis of pin 30, one of such pivoted positions being shown by the dotted lines in FIGURE 1.

To return valve shaft 13 and link 19 to the full line position shown in FIGURE 1 after counterclockwise motion from such position, fluid under pressure is introduced into the left hand end of motor 38 for retracting piston rod 43 and such retraction causes clockwise movement of link 19 and valve shaft 13.

From the above description, it is evident that pivot pin 30, rigidly attached to motor end cap 37, permits motor 38 to pivot with respect to housing 16 as necessary for causing angular movement of the link by the linearly acting piston rod 43, and that pin 30 may, if desired, serve as an outboard bearing for supporting piston rod 43. With this arrangement a very compact and lightweight valve operating mechanism is provided which is relatively inexpensive and simple to manufacture and service.

Furthermore, any given operator housing 16 may be used with fluid pressure motors 38 of different bore size. To do this, brackets 35, 36 are attached to end caps 37 of the various fluid pressure motors the same distance from each other to fit against the outer faces of brackets 26, 27. This permits all parts of the assembly between the valve 11 and motor 38, except in some instances piston rod 43, to be the same for fluid motors of various diameters.

Although certain forms of the invention have been illustrated and described, the invention as covered by the claims is not intended to be limited to the particular structures shown.

I claim:
1. A mechanism for turning a valve shaft comprising a housing for rigid attachment to the valve, a piston rod, a motor attached to the rod, a pin rigidly attached to the motor, said pin being pivotally attached to the housing, an opening through the pin transversely of its pivotal axis, said rod extending through the opening and movable longitudinally therein by said motor, a link pivotally attached to the rod and having means for rigidly attaching the link to the shaft for turning the shaft upon the movement of the rod.

2. A mechanism in accordance with claim 1 in which the motor has a pair of open ended brackets extending axially from one end thereof and said pin is rigidly attached to said brackets against said open ends.

3. A mechanism in accordance with claim 1 in which the motor has a pair of spaced brackets extending axially from one end thereof, each bracket having a semi-circular groove therein receiving said pin.

4. The mechanism of claim 1 in which the motor has a pair of projecting brackets against which said pin is rigidly attached by screws.

5. The mechanism of claim 1 in which the motor has a pair of projecting brackets having open recesses at their ends, said pin being mounted in said recesses and rigidly attached to said brackets by screws passing through said pin.

6. The mechanism of claim 5, in which said screws are threaded into the motor and also serve to attach the brackets to the motor.

7. A mechanism for turning a shaft relative to a housing, comprising a piston rod, a motor for moving the rod, a pin attaching the motor to the housing so as to permit pivotal motion therebetween, said rod extending through an opening in said pin, a link attached to the rod and having means for attachment to the shaft for turning the shaft upon movement of the rod, the housing and motor each having bracket means for attaching the same to the pin, one of said bracket means encircling said pin and the other having semicircular grooves for receiving the pin, said pin being rigidly attached to the bracket means with the semi-circular grooves.

References Cited by the Examiner
UNITED STATES PATENTS

| | | | |
|---|---|---|---|
| 2,911,953 | 11/1959 | Killian | 251—62 X |
| 2,954,754 | 10/1960 | Flick | 74—99 |
| 3,011,359 | 12/1961 | Morrell | 74—625 X |
| 3,043,160 | 7/1962 | Killian | 74—89 X |

BROUGHTON G. DURHAM, *Primary Examiner.*